Jan. 1, 1924
J. KENNEDY
AUTOMATIC BREAD MAKING MACHINE
Filed April 7, 1922
1,479,140
2 Sheets-Sheet 1
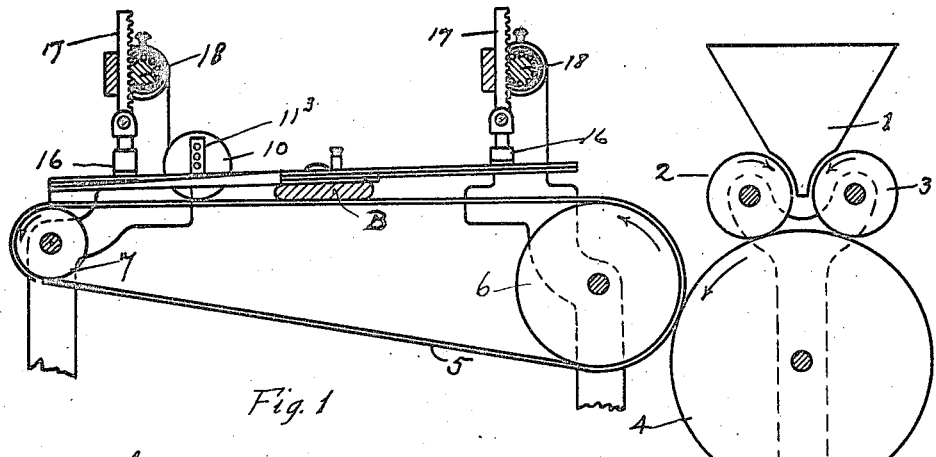
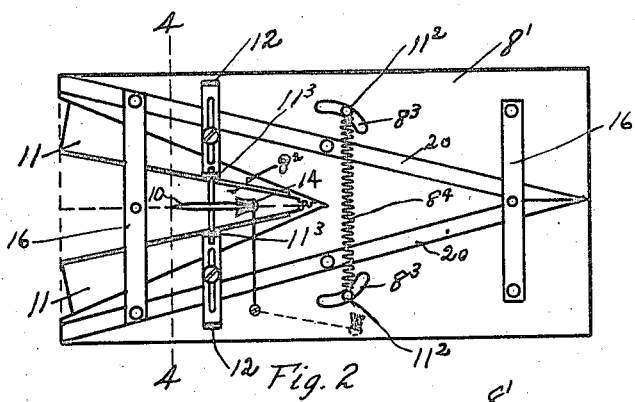 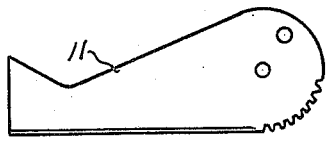
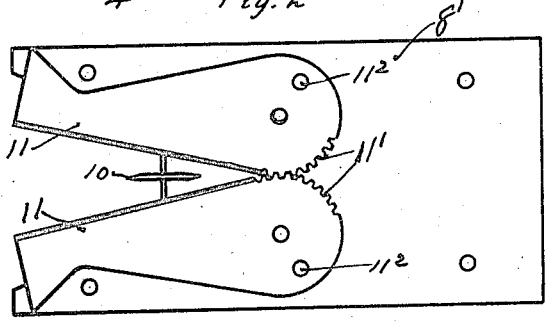 
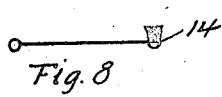
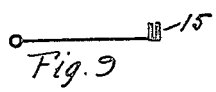
Inventor
Joseph Kennedy
Per Henry Marsh
Attorney Patented Jan. 1, 1924.

1,479,140

UNITED STATES PATENT OFFICE.

JOSEPH KENNEDY, OF PROVIDENCE, RHODE ISLAND.

AUTOMATIC BREAD-MAKING MACHINE.

Application filed April 7, 1922. Serial No. 550,503.

*To all whom it may concern:*

Be it known that I, JOSEPH KENNEDY, a subject of George V, King of Great Britain and Ireland, and a resident of Providence, in the county of Providence and State of Rhode Island, have invented a new and useful Automatic Bread-Making Machine, of which the following is a specification.

The purpose of my invention is to provide a bread making machine by which there may be formed at will from a mass of kneaded dough bread loaves of any desired size and shape, straight, Vienna, or double loaves.

To this end my invention consists of the new and useful construction, combination and arrangement of parts hereinafter described and illustrated in the accompanying drawings in which,—

Figure 1 is a side elevation of my bread making machine, the molding board adjusting means being shown partly in section.

Figure 2 is a top plan view of my newly invented molding-board.

Figure 3 is a bottom plan view of the same.

Figure 5 is a plan view of one of the molding-board jaws.

Figures 6 and 7 show Vienna loaves of different sizes.

Figures 8 and 9 are detail views of means for oiling the cutter which cuts the dough into double loaves.

Like reference latters and numerals indicate like parts where they occur in the several views of the drawings.

Figure 4:
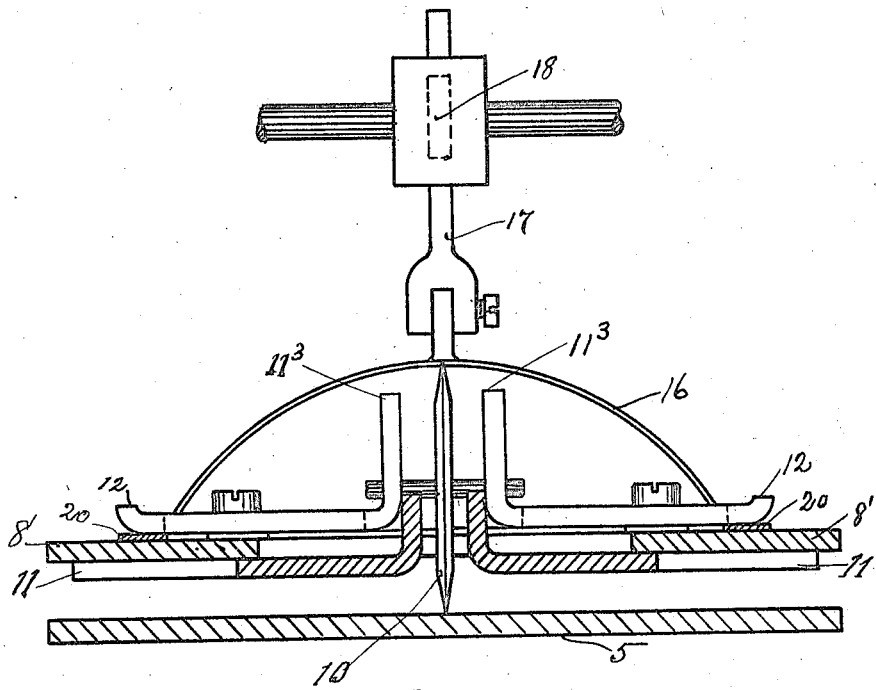
Figure 4 is an end view showing the molding-board adjusting means, the cutter for dividing a mass of dough into two loaves, and the conveyer apron in section, on line 4—4 of Figure 2.

Prior to my invention hereinafter described in the art of making bread loaves by machine it was necessary to employ a special form of molding-board for each shape of loaf.

By my invention I am enabled to form from a mass of dough any desired shaped loaf, as well as to form a double loaf, with my adjustable molding-board.

Referring to the drawings, I have shown in Figure 1 the well known parts of a bread making machine comprising the hopper 1, feed rolls 2, 3, 4, the endless conveyer apron 5 and its pulleys 6, 7, all supported on a frame and operated in the well known manner. I also show a mass of dough B carried on said apron, a molding-board 8 adjustably supported above said apron, the molding-board supporting and adjusting means 9, 9, and the cutter 10 for dividing a mass of dough into a double loaf.

The molding-board I construct of a body portion $8^1$ provided at one end with a longitudinally directed V-shaped open slot $8^2$. Upon the under side of the body $8^1$ I pivotally mount the separable jaws 11, 11, each of which is provided at its rear end with teeth 11 arranged in the form of a segment of a gear, and each arranged to mesh with each other. (Figs. 3, 5.) Eccentrically disposed with reference to the pivots of the respective jaws I dispose studs $11^2$, $11^2$, which extending through and operating in curved slots $8^3$, $8^3$, in the body $8^1$ are operatively connected by a spring $8^4$. Said jaws 11, 11 each have their inner edge turned upward to form a rounded edge to prevent cutting or scoring the dough passing under them. The jaws are set flush with the under surface of the body $8^1$, and are movable laterally on their respective pivot to cover or uncover the V-shaped slot $8^2$. The degree of separation of the jaws 11, 11 pivoted on the under side of the body $8^1$ is regulated by the contact with the upturned edges of the latter of the slidable keepers 12, 12 positioned opposite and in alinement with each other on the upper side of said body and each provided with upturned ends $11^3$, $11^3$, and with perforations arranged in vertical series (Fig. 1) to receive the shaft of the cutter 10 and afford means for adjusting the position of the latter vertically relative to the conveyer-apron so that the apron will not be cut by it.

The jaws 11, 11, are separable to the degree required to form the desired sized loaf of bread, and they are held in their adjusted position by the dogs 12 and uprights $11^3$, $11^3$. In Figure 2 I have shown the jaws opened to partly uncover the V-shaped slot $8^2$, such opening will enable a corresponding sized loaf to be formed by the jaws as the dough passes outward from the machine. The cutter 10 may be removed when it is not desired to form a double loaf. In order to prevent the dough sticking to the cutter I provided an oiling brush 14, or a felt oiler 15, either of which is pivoted on the upper surface of the body $8^1$ and swung into position to wipe the cutter 13, or swung away out of contact with the cutter (Fig. 2) as may be necessary, or desirable.

To form a straight loaf or a loaf of uniform cross section the jaws 11, 11 are closed together to entirely cover the slot 8², as indicated by the dotted line in Figure 2.

Upon each end of the upper surface of the molding-board 8 I mount a transversely directed spring 16, 16, engaged by a vertically extending rack 17, engaging a pinion 18 supported above the said spring. This affords me preferable means for adjusting the molding-board relatively to the conveyer-apron and securing it in its adjusted position. While I have shown this particular adjusting means it is to be understood that I do not limit my invention to that specific form of adjustment, as any means for adjusting and holding the molding-board in proper position relative to the conveyer-apron will be applicable.

In the practical operation of my invention, the parts being assembled as shown and described, the jaws 11, 11 are adjusted to the proper position relatively to each other to enable the board to form the desired shape and size of loaf desired. The mass of dough is then carried under them by the conveyor-apron, and the molding board shapes the loaf as desired. In case a double loaf, that is, a loaf cut midway into two sections, is desired the cutter 10 is mounted on its shaft inserted through the appropriate perforations in the uprights 11³, 11³, the oiler 14 or 15 is swung into contact with the cutter and retained there so long as necessary.

As the mass of dough is passed under the separated jaws it will be permitted to expand in its central section to thereby form a "Vienna" loaf.

It is obvious that the shape of the jaws 11, 11 may be varied without departing from the principle of my invention so long as they are operatively connected for conjoint action in covering or uncovering the open V-shaped slot 8². The body portion 8¹ may be of shortened length and the jaws pivoted to it so that they will form a continuation of the body and be separated at will to form the V-shaped open slot, as 8² at the end of the board, in which case the braces 20, 20 would be extended as far as the outer ends of the jaws. In any case the jaws would be set flush with the under face of the body so as to present an even smooth surface to contact with the mass of dough passing thereunder.

When the jaws are closed together as indicated by the dotted line in Figure 2 a loaf of uniform cross section will be formed. The degree of separation of the jaws will determine the size of loaf formed.

The cutter 10 is freely revoluble on its shaft and is readily adjusted in the uprights 11³ so that it may not cut the apron conveyer.

I claim as my invention and desire to secure by Letters Patent—

1. In a bread making machine having a conveyer for a mass of dough and means for actuating said conveyer, the combination therewith of a molding-board adjustably mounted above said conveyer and consisting of a body portion terminating at one end in a V-shaped open slot, spring controlled laterally separable jaws pivoted on said body portion and arranged and adapted to cover and uncover said slot, at will, and each provided at its rear part with teeth segmentally disposed and arranged to mesh with the teeth of the other jaw, and means for governing the opening and closing movements of said jaws.

2. A molding-board comprising a body portion having a V-shaped open slot at one end, spring controlled laterally separable jaws pivotally mounted on said body portion for opening and closing movements to cover and uncover said open slot, a spring connecting the rear ends of said jaws and operative to open said jaws, and means mounted on said body portion for limiting the opening movement of said jaws, all in combination with each other and arranged and adapted to serve as and for the purposes specified.

3. A molding board having spring controlled laterally separable jaws arranged and adapted to be opened into V-shape to form a "Vienna" shaped loaf, or to be closed together to form a loaf of uniform cross section, in combination with means for actuating said jaws and other means for limiting their opening movement.

4. In a bread making machine the combination with laterally separable jaws pivotally mounted on a molding-board body, of a revoluble cutter disposed between said jaws and adjustably supported upon the molding-board body.

5. In a machine for forming loaves of bread having a molding-board and spring controlled laterally separable jaws pivoted on said board the combination therewith of means mounted on said board and arranged and adapted to limit the opening movement of said jaws.

6. In a machine for forming bread loaves, a molding-board terminating at one end in spring controlled laterally separable jaws arranged and adapted on their separation to form an open longitudinally directed slot at said end of said molding-board, as and for the purposes specified.

7. A molding-board for forming bread loaves having oppositely disposed spring controlled laterally separable jaws, each provided adjacent its rear end with teeth segmentally disposed, the teeth of one jaw meshing with those of the other jaw whereby said jaws are actuated conjointly in their opening and closing movements.

JOSEPH KENNEDY.